July 10, 1962  L. PÉRAS  3,043,414
DOG CLUTCHES, APPLICABLE NOTABLY TO SYNCHRONIZERS
Filed Dec. 14, 1959  2 Sheets-Sheet 1
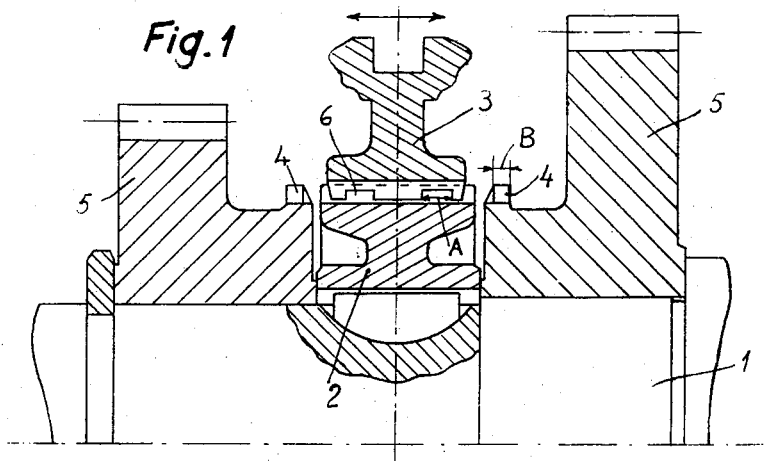
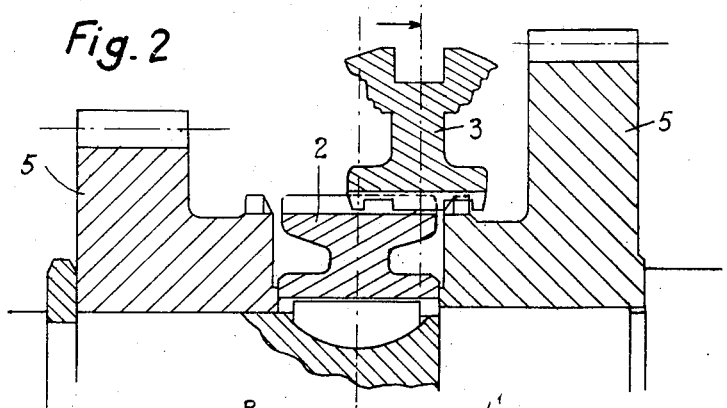
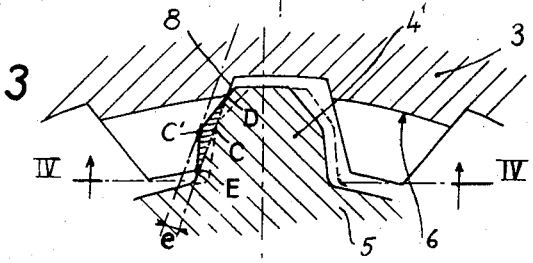
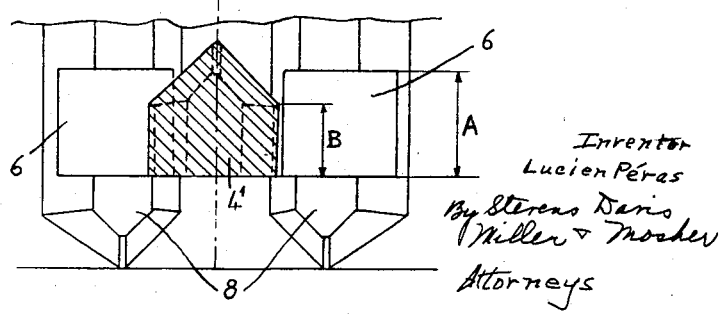
Inventor
Lucien Péras
By Stevens Davis
Miller & Mosher
Attorneys

United States Patent Office 3,043,414
Patented July 10, 1962

3,043,414
DOG CLUTCHES, APPLICABLE NOTABLY TO SYNCHRONIZERS
Lucien Péras, Billancourt, France, assignor to Regie Nationale des Usines Renault, Billancourt, France
Filed Dec. 14, 1959, Ser. No. 859,410
Claims priority, application France Dec. 31, 1958
3 Claims. (Cl. 192—114)

This invention relates to dog clutches, synchronized or not, of the type comprising a sliding hub member and a pinion both provided with co-acting dog teeth, which are used extensively in gearbox construction and many other transmission mechanisms.

It is the essential object of this invention to prevent a possible detrimental uncoupling or disengagement of these dog clutches when they are engaged and under load, that is, in a torque-transmitting condition.

The improvement constituting the subject-matter of this invention is particularly and advantageously applicable to synchronizer and in this case they are adapted, when a speed is engaged, to prevent the untimely disengagement of the teeth of the sliding hub member relative to those of the corresponding pinion of the synchronizer.

A method has already been proposed wherein this tendency of dog clutches to disengage is counteracted by forming on the side face of the teeth of the sliding hub member botches engageable by the dog teeth of the relevant gear pinion. This process, although efficient, involves however costly machining steps.

This invention provided this result through considerably more economical and simpler means, this fact being extremely important in the case of mass production.

It consists essentially on the one hand in forming, on the dog teeth portion of the sliding hub member which corresponds to the co-acting pinion to be engaged, a circular, relatively shallow groove of a width greater than that of the dog teeth of said pinion, and on the other hand in providing different contours for these dog teeth in the zone corresponding to the depth of the aforesaid circular groove, so that when these dog teeth have been brought into relative driving engagement an axial retaining action in the aforesaid groove is ensured by a slight relative angular displacement or shift of the teeth.

The desired result is thus obtained by simply adding the machining step consisting in forming this shallow circular groove, which is a very simple operation that can be effected on a lathe, under these conditions, this solution to an old problem can be said to be definitely consistent with the mass production of dog clutches.

The practical application of this improvement brought by the present invention will appear clearly as the following description proceeds with reference to the accompanying drawings forming part of this specification and illustrating diagrammatically by way of example a few typical forms of embodiment of the invention. In the drawings:

FIGURES 1 and 2 are diagrammatical axial sections showing the elements of a synchronizer (shown only partially), to which this invention is applied;

FIGURE 3 shows a typical form of embodiment of the invention in the form of a cross-sectional view of a dog clutch pinion tooth with the registering teeth of the sliding hub member during their relative engagement;

FIGURE 4 is a view taken in the direction of the arrow IV—IV of FIG. 3;

Figure 5:
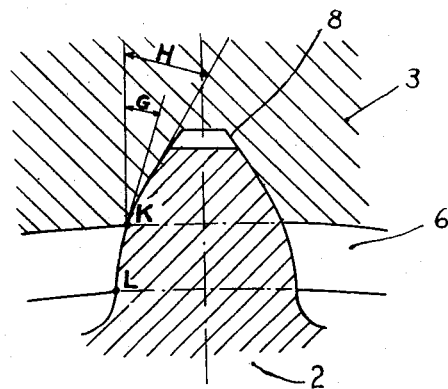
FIGURES 5 and 6 are views similar to FIG. 3 showing a different form of embodiment of the invention, namely, FIG. 5 being a cross-section showing a separate tooth of the sliding hub member and FIG. 6 a cross-section showing the same tooth in meshing engagement with the registering dog teeth of the pinion.

It will be noted that FIGS. 1 and 2 serve only the purpose of illustrating the invention and should not be construed as limiting it, as they purposely give only a fragmentary view of a synchronizer of which only the elements to be dealt with in connection with the principle of this invention are shown.

In this example the synchronizer illustrated comprises a shaft 1 having keyed thereon, as in conventional practice, the inner hub 2 of the synchronizer which is rotatably solid with the outer dog member 3 and adapted to engage the relevant dog teeth 4 of either of two gear pinions 5 mounted for loose rotation on the shaft 1 and on either side of the assembly 2, 3.

This dog engagement, as already known, takes place only when the synchronization is effected, this being generally obtained by utilizing friction cones or rings (not shown) interposed to this end between the sliding hub and the pinions.

Of course, this form of embodiment constitutes but a mere example amongst many others, the invention providing essentially the means already set forth for preventing, in a similar dog clutch device, the disengagement of the sliding hub from the dog teeth of a cooperating pinion when these members are engaged and under load.

These means consist, as shown in FIGS. 1 and 2, in providing in the sliding hub dog teeth portion corresponding to each pinion to be engaged a relatively shallow circular groove 6, that is, of a depth inferior to the height of these teeth, this groove having a width A greater than the width B of the dog teeth 4 of the pinion. It also consists in providing different contours for these teeth, at least in the zone corresponding to the depth of the aforesaid groove 6, as shown notably in FIGS. 3 and 6 of the drawings.

In FIG. 3, a dog tooth $4^1$ of the pinion engages the tooth 8 of the sliding hub member in which the aforesaid shallow groove is formed as visible at 6.

Assuming that this groove were not provided the side faces of the teeth concerned would contact each other along a line extending across the point C.

Due to the provision of this groove 6, after the engagement of the dog teeth and as shown in thick lines, each dog tooth $4^1$ of the pinion will be shifted angularly with respect to the tooth 8 of the sliding hub so as to contact this tooth along a line across the point D, that is, the line of intersection of the bottom of groove 6 with the side face of the sliding hub dog tooth.

The different contours of these teeth in the zone of groove 6 are such that an axial positioning action will be obtained for each dog tooth, this action occurring along the cross-hatched area C—D—$C^1$—E. The value of the shift $e$ may be of the order of one fraction of a millimeter.

FIG. 4 also shows on a larger scale the same dog teeth in their position of relative engagement effected in the direction of the arrow F, these teeth being oppositely bevelled according to the known practice in order to facilitate their relative engagement.

Figure 6:
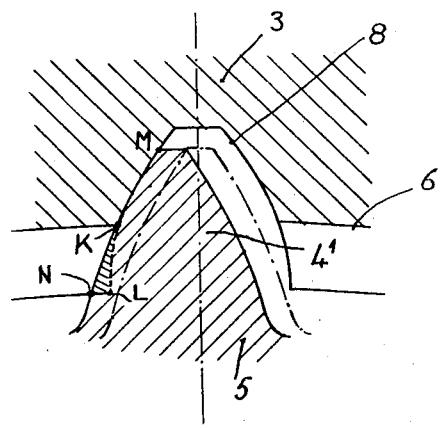

Of course, and as illustrated in FIGS. 5 and 6, a driving contact between the dog teeth may be provided which takes place not along lines but through co-acting bearing surfaces in order to improve the resistance of the mechanism to wear and tear.

It is sufficient that the teeth contour be similar, in their outer portions, to the bottom of the groove 6 formed on the sliding hub.

This is obtained in the example illustrated by forming the teeth 8 of the sliding hub member with a contour generated along two involutes corresponding to different pressure angles $\hat{G}$—$\hat{H}$ before and after the groove 6 (see FIG. 5), the angle $\hat{G}$ of contour K—L positioned before the groove 6 being smaller than the angle $\hat{H}$, whereas the dog teeth $4^1$ of the gear are generated along an involute corresponding to a same pressure angle Ĥ (see FIG. 6).

As a matter of fact, FIG. 5 shows the dog teeth of the sliding member and those of its inner hub 2, whereas in FIG. 6 it appears clearly that after the engagement of these dog teeth has been effected their pressure areas will be determined by a generatrix K—M, the axial retaining surfaces corresponding for each tooth to the cross-hatched area K—L—N.

I claim:

1. A dog clutch coupling device for torque transmission comprising two annular members mounted for relative sliding displacement, said members having engageable teeth, one of said members having a circular groove formed through the teeth, said circular groove having a depth less than the height of engagement of said teeth and having a width greater than the axial length of the teeth of the other of said members, and the teeth of said members having different outlines in their zone of engagement corresponding to the depth of the groove and having an angular clearance in their zone of engagement extending out of said groove, thereby permitting and providing an axial hooking engagement of said teeth in said groove when engaged and under torque.

2. A dog clutch coupling device for torque transmission comprising two annular members mounted for relative sliding displacement, said members having engageable teeth, one of said members having a circular groove formed through the teeth, said circular groove having a depth less than the height of engagement of said teeth and having a width greater than the axial length of the teeth of the other of said members, and the teeth of said members having different outlines in their zone of engagement corresponding to the depth of the groove and having an angular clearance in their zone of engagement extending out of said groove, thereby permitting and providing an axial hooking engagement of said teeth in said groove when engaged and under torque, the sides of the engageable teeth having, outside of said zone of the groove, an analogous contour.

3. A dog clutch of the sliding-hub type for torque transmission comprising a sliding-hub member, a pinion, said hub member and pinion having engaging teeth, the sliding-hub member having a circular groove formed through the teeth, said circular groove having a depth less than the height of engagement of the teeth of the sliding-hub member and having a width greater than the axial length of the teeth of the pinion and the teeth of said hub member and pinion having different outlines in their zone of engagement corresponding to the depth of the groove and having an angular clearance in their zone of engagement extending out of said groove, thereby permitting and providing an axial hooking engagement of said teeth in said groove when engaged and under torque.

References Cited in the file of this patent

UNITED STATES PATENTS

| | | |
|---|---|---|
| 2,070,140 | Peterson et al. | Feb. 9, 1937 |
| 2,529,492 | Gilbert | Nov. 14, 1950 |
| 2,846,038 | Brownyer | Aug. 5, 1958 |
| 2,887,201 | Willis | May 19, 1959 |